United States Patent [19]

Leatherman

[11]  4,368,310

[45]  Jan. 11, 1983

[54] METHOD OF POLYMERIZING SHEETS

[75] Inventor: Ivan R. Leatherman, Wadsworth, Ohio

[73] Assignee: PPG Industries, Inc., Pittsburgh, Pa.

[21] Appl. No.: 314,265

[22] Filed: Oct. 23, 1981

[51] Int. Cl.³ ............................................. C08F 18/24
[52] U.S. Cl. ...................................... 526/314; 526/88
[58] Field of Search ........................... 526/72, 88, 314

[56]  References Cited

U.S. PATENT DOCUMENTS

| | | | |
|---|---|---|---|
| 2,326,326 | 8/1943 | Breedis | 526/88 |
| 3,514,341 | 6/1970 | Haryu et al. | 264/255 |
| 3,700,761 | 10/1972 | O'Driscoll et al. | 264/1 |
| 3,816,571 | 6/1974 | O'Driscoll et al. | 264/1 |
| 3,935,292 | 1/1976 | Okubo et al. | 264/338 |
| 4,095,772 | 6/1978 | Weber | 249/82 |

*Primary Examiner*—Paul R. Michl
*Attorney, Agent, or Firm*—Richard M. Goldman

[57]  ABSTRACT

Disclosed is a method of polymerizing a monomer by forming a film or pool of monomer atop an immiscible liquid and initiating the polymerization. In this way there is obtained a thin sheet of polymers substantially free of imperfections on the surface thereof in contact with the liquid. According to a further exemplification a second, less dense, but also immiscible liquid is established above the monomer whereby to form a second smooth surface.

4 Claims, No Drawings

METHOD OF POLYMERIZING SHEETS

It has heretofore been difficult to cast monomers in thin films because of the shrinkage of the monomer during polymerization, and the heat evolved.

It has now been found that a particularly satisfactory thin casting may be prepared by forming a pool of monomer atop an inert liquid and carrying out the polymerization, i.e., the bulk polymerization, atop the pool of inner liquid.

Castings of bis(allyl carbonate) monomers, e.g., aliphatic diol bis(allyl carbonate) monomers, are characterized by hardness, abrasion resistance and optical clarity.

DETAILED DESCRIPTION OF THE INVENTION

It has now been found that polymerizates, both fully cured and partially cured, of monomers, e.g., aliphatic diol bis(allyl carbonates), especially thin polymerizates, e.g., thinner than about 5 millimeters, may be prepared by carrying out the polymerization atop an inert liquid. That is, the polymerization may be carried out by establishing a pool of monomer, such as bis(allyl carbonate) monomer, atop a surface of an inert liquid, and carrying out the polymerization as a bulk polymerization atop the inert liquid.

By an inert liquid is meant a liquid that is substantially nonreactive with both the monomer and the polymer, substantially immiscible with both the monomer and the polymer, and of a higher density than either the monomer or the polymer. The reaction is a bulk reaction carried out in the layer film or pool of monomer formed above the liquid film.

By the liquid being substantially non-reactive with the monomer or polymer is meant that no products of monomer and the liquid, of the polymer and the liquid, or of the initiator and liquid are formed under conditions which would inhibit, or retard the bulk polymerization reaction or degrade the resulting polymer.

By the liquid being immiscible is meant that the solubility of the monomer is below the level of solubility of monomers that are polymerized in a solution, i.e., solution polymerization such as aqueous polymerization. That is, the reaction is not one which produces a homogeneous solution of polymer in solvent or a colloid, or latex, or precipitate. By way of exemplification, the solubility of the monomer in the liquid should be well below the two weight percent solubility of methylmethacrylate in water whereby the methylmethacrylate is polymerized in a water system. Preferably, the solubility of the monomer in the liquid is under 0.1 weight percent, basis weight of the liquid, and is preferably under 0.02 weight percent, basis weight of the liquid, as is the case with vinylidene chloride in water. Especially preferred is the low solubility of monomer in solution, e.g., of long chain aliphatic allyl unsaturates in water, many having a solubility of less than 0.02 weight percent and in the case of certain monomers less than 0.01 weight percent, basis weight of the water. Exemplary monomers include allyl ethers such as trimethylolpropane monoallyl ether, trimethylolpropane diallyl ether, and allyl esters.

While various monomers may be cast by the method of this invention, especially preferred diol bis(allyl carbonate) monomers which may be polymerized by the method of this invention are normally linear, aliphatic liquid allyl carbonates, i.e., diol bis(allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, alkylene polyether or alkylene carbonate group having from 2 to 10 carbons and oxygens. These diol bis(allyl carbonate) monomers are represented by the formula:

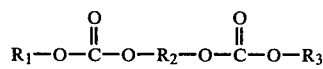

where $R_1$ and $R_3$ are allyl or substituted allyl groups, and $R_2$ is as defined below. $R_1$ and $R_3$ are independently represented by the formula:

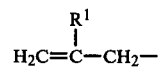

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$, alkylene polyether groups such as $-CH_2CH_2-O-CH_2CH_2-O-CH_2CH_2-O-CH_2CH_2-$, and $-CH_2-O-CH_2-$ groups, and alkylene carbonate groups such as $CH_2CH_2-O-CO-O-CH_2CH_2$ and $-CH_2CH_2-O-CH_2CH_2-O-CO-O-CH_2CH_2-OCH_2CH_2-$ groups. Most commonly, $R_2$ is $-CH_2CH_2-$ or $-CH_2CH_2-O-CH_2CH_2-$.

Specific examples of diol bis(allyl carbonate) monomers useful in carrying out the method herein contemplated include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

Commercially important diol bis(allyl carbonate) monomers which may be polymerized by the method herein contemplated are:

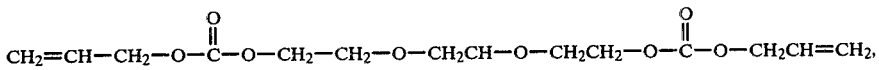

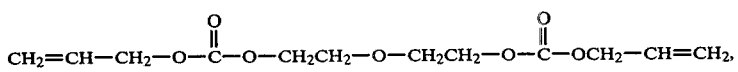

and

The polymerization of the diol bis(allyl carbonate) composition is initiated by the creation of active centers, e.g., free radicals, carbanions, and carbonium ions. Useful free radical initiators are peroxy initiators. The peroxy initiators include: isobutyryl peroxide; di(2-ethylhexyl) peroxydicarbonate; acetyl cyclohexane sulfonyl peroxide; di(secbutyl) peroxydicarbonate; diisopropyl peroxydicarbonate; 2,4-dichlorobenzoyl peroxide, t-butyl peroxypivalate; decanoyl peroxide; lauroyl peroxide, propionyl peroxide; 2,5-dimethyl-2,5-bis(2-ethyl hexylperoxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide, 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate and t-butyl peroxybenzoate.

Especially preferred peroxy initiators are those that do not discolor, char, or burn the resulting polymerizate. Exemplary are diisopropyl peroxydicarbonate and benzoyl peroxide.

The reaction herein contemplated is a quiescent bulk polymerization where the monomer is initially present on a pool of liquid in which liquid pool neither the polymer nor the monomer is soluble. In this way it differs from suspension polymerization in that the monomer is present as a film or layer on the surface of the liquid pool rather than as bubbles of monomer suspended therein, there being substantially no stirring of the liquid pool, and that the polymer is formed as a thin film or sheet rather than as a filterable suspension.

The method herein contemplated also differs from emulsion polymerization in that the monomer and initiator are present in the same organic phase, layer, or film on the surface of the liquid pool rather than as bubbles of monomer suspended in a medium of solvent and initiator and that the polymer is formed as a thin sheet or film rather than as a latex. The bulk polymerization herein contemplated differs from solution polymerization in that the monomer is substantially insoluble in the liquid pool and the monomer and liquid pool are substantially immiscible with each other.

Solvents useful herein include aqueous solvents such as water, and water rendered more dense by addition of salts or other additives. Suitable salts include calcium chloride, magnesium chloride, sodium chloride and potassium chloride.

Additionally non-reactive organics can be used as the solvent, that is organics which do not interfere with the reaction. Preferred are alcohols, especially polyhydric alcohols. Suitable polyhydric alcohols include diols, triols, and tetrahydric alcohols. Also, soluble saccharides, starches, and cellulosics that do not inhibit the reaction or degrade the product and that increase the density of the liquid pool may be used, for example, glucose, sucrose and the like. Alternative mercury and non-reactive amalgams can be used.

According to one exemplification herein contemplated, a liquid pool of mercury is established. Thereafter a thin pool or film of diethylene glycol bis(allyl carbonate) containing from about 2 to about 4 weight percent isopropyl peroxy dicarbonates is established atop the mercury. Thereafter, a thin film of a lighter liquid, i.e., an immiscible liquid having a density less than that of the diethylene glycol bis(allyl carbonate) is established atop the diethylene glycol bis(allyl carbonate) film whereby to avoid oxidation thereof. The temperature of the material is increased whereby to activate the initiator and commence polymerization. After approximately 12 hours of cure, a film about 2 millimeters thick of polydiethylene glycol bis(allyl carbonate) is recovered.

According to an alternative exemplification of this invention, an aqueous saturated brine is prepared containing calcium chloride. A film of tetraethylene glycol bis(allyl carbonate) and benzoyl peroxide is formed atop the saturated brine and the polymerization commenced by increasing the temperature to activate the initiator. After approximately 8 hours a film of polytriethylene glycol bis(allyl carbonate) having a thickness of about 1 millimeter is recovered.

The following examples are illustrative:

EXAMPLE I

Two films of poly(diethylene glycol bis(allyl carbonate) were prepared by casting diethylene glycol bis(allyl carbonate) in a pool of mercury.

Two flat bottom crystallizing dishes, one 3 inches inside diameter, the other 3⅜ inches inside diameter were filled with mercury. Then 20 grams of a solution of PPG Industries, Inc. CR-39 ® brand diethylene glycol bis(allyl carbonate) containing 3 weight percent isopropyl peroxy dicarbonate initiator was poured on top of the mercury pool in each dish.

The dishes were set in a vacuum desiccator which was purged with nitrogen and then heated according to the cycle shown below:

| Elapsed Time (hours) | Temperature, °C. |
| --- | --- |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |

-continued

| Elapsed Time (hours) | Temperature, °C. |
|---|---|
| 20 | 61 |
| 22 | 59 |
| 23 | 79 |
| 24 | 98 |
| 24.1 | 100 |

The resulting circular films were approximately 0.125 inch thick and 0.063 inch thick, and had a 0.15 second Barcol hardness of 24–20.

EXAMPLE II

A series of tests were conducted to prepare thin castings. In each test a lens casting gasket was slipped onto a 3 inch inside diameter crystallizing dish, mercury was poured into each dish to establish a liquid pool, a solution of 3 weight percent isopropyl peroxydicarbonate in PPG Industries. Inc. CR-39 ® brand diethylene glycol bis(allyl carbonate) was poured on top of the mercury pool. Each of the dishes were set in a vacuum desiccator, which was purged with nitrogen and treated according to the treating cycle shown in Example I.

RUN A

Two grams of monomer-initiator solution were poured atop the mercury pool. The resulting product was a flexible, 4 mil thick film.

RUN B

Four grams of monomer-initiator solution were poured atop the mercury pool. The resulting product was a flexible 8 mil thick film.

RUN C

Six grams of monomer-initiator solution were poured atop the mercury pool. The resulting product was a flexible, 13 mil thick film.

RUN D

Ten grams of monomer-initiator solution were poured atop the mercury pool. The resulting product was a 45 mil thick rigid sheet.

EXAMPLE III

A series of tests were conducted polymerizing diethylene glycol bis(allyl carbonate) at various initiator loadings atop a pool of saturated aqueous sodium chloride.

In each test a lens casting gasket was slipped onto a 4 inch inside diameter crystallizing dish, saturated sodium chloride brine was poured into each dish to establish a liquid pool, and twenty grams of a monomer-initiator solution containing PPG Industries, Inc. CR-39 ® brand diethylene glycol bis(allyl carbonate) and isopropyl peroxy dicarbonate initiator was poured atop the brine pool. Each of the crystallizing dishes was then set in a vacuum desiccator, purged with nitrogen, and heated as described in Example I.

The following results were obtained:

| Weight Percent Isopropyl Peroxy Dicarbonate (basis: total weight of sample) | Barcol Hardness (0–15 seconds) |
|---|---|
| 3.5% | 14–0 |
| 4.0% | 18–14 |
| 4.5% | 19–15 |
| 5.0% | 20–15 |

EXAMPLE IV

A series of tests were conducted polymerizing diethylene glycol bis(allyl carbonate) at various initiator loadings atop a pool of a saturated aqueous sucrose solution.

In each test a lens casting gasket was slipped onto a 4 inch inside diameter crystallizing dish, a saturated aqueous sucrose solution was poured into each dish to establish a liquid pool, and twenty grams of a monomer-initiator solution containing PPG CR-39 ® brand diethylene glycol bis(allyl carbonate) and isopropyl peroxydicarbonate initiator was poured atop the saturated sucrose solution liquid pool. Each of the crystallizing dishes was then set in a vacuum desiccator, purged with nitrogen, and heated as described in Example I The following results were obtained:

| Weight Percent Isopropyl Peroxy Dicarbonate (basis: total weight of sample) | Barcol Hardness (0–15 seconds) |
|---|---|
| 3.5% | 0–0 |
| 4.0% | 14–9 |
| 4.5% | 22–17 |
| 5.0 | 27–22 |

While the inventive concept has been claimed and described with respect to certain exemplifications and embodiment, the scope of protection is not intended to be limited thereby, but only by the claims appended hereto.

I claim:

1. A method of polymerizing aliphatic diol bis(allyl carbonate) monomer to form polymers thereof comprising:
   providing a pool of liquid in which the monomers and the polymers to be formed are substantially insoluble;
   forming a layer of monomer and initiator atop the pool of liquid; and
   thereafter recovering polymer from atop the pool of liquid.

2. The method of claim 1 comprising continuously forming a layer of monomer and liquid on the liquid pool, and continuously recovering polymer from atop the liquid pool.

3. The method of claim 1 wherein the liquid pool comprises mercury.

4. The method of claim 1 wherein the liquid pool comprises an aqueous solution of higher density than the monomer and the polymer.

* * * * *